(12) United States Patent
Reckzeh

(10) Patent No.: US 8,579,237 B2
(45) Date of Patent: Nov. 12, 2013

(54) SYSTEM FOR SETTING THE SPAN LOAD DISTRIBUTION OF A WING

(75) Inventor: Daniel Reckzeh, Stuhr (DE)

(73) Assignee: Airbus Operations GmbH (DE)

( * ) Notice: Subject to any disclaimer, the term of this patent is extended or adjusted under 35 U.S.C. 154(b) by 619 days.

(21) Appl. No.: 11/206,313

(22) Filed: Aug. 17, 2005

(65) Prior Publication Data

US 2006/0038086 A1 Feb. 23, 2006

Related U.S. Application Data

(60) Provisional application No. 60/603,110, filed on Aug. 19, 2004.

(30) Foreign Application Priority Data

Aug. 19, 2004 (DE) .......................... 10 2004 040 313

(51) Int. Cl.
*B64C 9/00* (2006.01)

(52) U.S. Cl.
USPC .............. 244/217; 244/45 R; 244/198; 701/3; 701/4

(58) Field of Classification Search
USPC ........ 244/217, 45 R, 46, 198; 701/3, 4, 6, 15, 701/16
See application file for complete search history.

(56) References Cited

U.S. PATENT DOCUMENTS

| | | | | |
|---|---|---|---|---|
| 3,204,895 A | * | 9/1965 | Razak | 244/136 |
| 3,347,498 A | * | 10/1967 | Priestley et al. | 244/191 |
| 3,659,810 A | * | 5/1972 | Robertson | 244/76 R |
| 4,479,620 A | * | 10/1984 | Rogers et al. | 244/195 |
| 4,725,020 A | * | 2/1988 | Whitener | 244/76 R |
| 4,796,192 A | * | 1/1989 | Lewis | 244/76 R |
| 5,082,207 A | * | 1/1992 | Tulinius | 244/195 |
| 5,088,661 A | * | 2/1992 | Whitener | 244/76 R |
| 5,740,991 A | * | 4/1998 | Gleine et al. | 244/203 |
| 7,243,881 B2 | * | 7/2007 | Sakurai et al. | 244/212 |
| 7,274,308 B2 | * | 9/2007 | Bateman et al. | 340/959 |
| 7,494,094 B2 | * | 2/2009 | Good et al. | 244/215 |
| 2006/0169848 A1 | * | 8/2006 | Libby | 244/216 |

FOREIGN PATENT DOCUMENTS

DE 31 14 143 A1 10/1982
DE 35 30 865 A1 3/1987

OTHER PUBLICATIONS

G. Dargel, et al., "Aerodynamische Flügelauslegung Mit Multifunktionalen Steuerflächen," Deutscher Luft-und Raumfahrtkongress 2002.
Rudolph, Peter K.C. "High Lift Systems on Commercial Subsonic Airliners," NASA Contractor Report 4746, Sep. 1996.

* cited by examiner

*Primary Examiner* — J. Woodow Eldred
(74) *Attorney, Agent, or Firm* — Lerner, David, Littenberg, Krumholz & Mentlik, LLP

(57) ABSTRACT

A system for setting a span load distribution of a wing of an aircraft with a base flap system comprises at least one inboard flap element and one outboard flap element, which elements in the direction of the span are arranged on the trailing edge of the wing, and can be positioned relative to the span direction of the wing. The flap elements are not mechanically coupled with each other and are controlled independently of each other for the purpose of setting the span load distribution.

10 Claims, 1 Drawing Sheet

SYSTEM FOR SETTING THE SPAN LOAD DISTRIBUTION OF A WING

CROSS-REFERENCE TO RELATED APPLICATIONS

This application claims the benefit of the filing date of U.S. Provisional Patent Application No. 60/603,110 filed Aug. 19, 2004, the disclosure of which is hereby incorporated herein by reference.

BACKGROUND OF THE INVENTION

The present invention relates to a system for setting the span load distribution of a wing, in particular high-lift systems on the wings of large commercial aircraft.

Almost without exception, in already-known systems (Rudolph P. K. C., High-Lift Systems on Commercial Subsonic Airliners, NASA CR 4746) the trailing edge of wings of large commercial aircraft has landing flap elements that are divided in the direction of the span. The reasons for this are the geometry of the wing, the dimensions of the components, and the control of the flap elements by the system. In a conventional design of the high-lift system, the landing flap elements are coupled to each other, i.e. they are extended at the same angle. In this way, the actuators for all flap elements can be driven by a central drive system. The aerodynamic design of the high-lift wing is governed by the side constraint of synchronous extension of all flap elements.

Such a high-lift system is believed to not make it possible to adapt in any way the span load distribution to increase the start lift/drag ratio and the maximum lift.

Another already-known high-lift system (Dargel G., et al, "Entwicklung eines Flügels mit multifunktionalen Steuerflächen" [Development of a wing with multifunctional control surfaces] in ProHMS, DGLR annual conference 2002), which system attempts to overcome the above-mentioned disadvantages, requires a very considerable system effort because the base flap system is operated without any changes and an additional secondary system is installed on the trailing edge of the base flap system.

SUMMARY OF THE INVENTION

According to an exemplary embodiment, a system for setting a wing span load distribution of a wing is provided, comprising a base flap system with an inner flap element and an outer flap element. The inner flap element and the outer flap element are arranged in a direction of the wing span at a trailing edge of the wing. The inner flap element and the outer flap element are displaceable relative to the wing span direction of the wing. The inner flap element and the outer flap element are not mechanically coupled with each other.

In the system according to this exemplary embodiment, the flap elements (e.g. the landing flaps) of the otherwise unchanged geometric layout of the flap system are positioned and/or displaced independently of each other.

It is believed that this exemplary embodiment provides a system which makes it possible to set the span load distribution for increasing the start lift/drag ratio and the maximum lift in a simple way.

It may be advantageous to use drive systems which can position the inboard and outboard flap elements independently of each other. Only the common drive of the respective corresponding elements on the right and the left wing remains, so as to exclude asymmetrical positioning.

According to an exemplary embodiment, there is no mechanical coupling between the landing flap elements. The landing flap elements of a wing can thus be positioned independently of each other along their entire extension path. This can be carried out manually by the pilot or automatically by an electronic control system.

It is believed that by the independent positioning of inboard and outboard landing flap elements of a wing, the span load distribution can be adjusted accordingly to increase the start lift/drag ratio and the maximum lift.

According to another exemplary embodiment, for optimising the span lift distribution on the wing, a conventional geometric layout of a high-lift wing can be used.

The optimisation potential in relation to the start lift/drag ratio is primarily provided by way of the induced resistance. By adjusting the excursion of the flap elements, the induced resistance can be reduced. The outboard flap element may be positioned at a larger angle than the inboard flap element. In this way the load distribution of the wing is displaced towards the outside; as a result of this displacement, lift distribution can be approximated more closely to an "ideal elliptic" distribution.

The optimisation potential in relation to maximum lift is provided by the option of taking some of the load off the wing in the region where airflow separation occurs and limits maximum lift. By a targeted reduction of the flap excursion in this region, the local load can be reduced and airflow separation can be shifted to higher angles of attack.

A further advantage may occur in the option of modifying the wake disturbance effect of the wing. The downwash in the inboard region can be simply reduced by reducing the excursion of the inboard landing flap, which has a positive influence on the effectiveness of the horizontal tail.

In addition, in the case of a transport aircraft which is for example used for air drops, the dropping for example of parachutists or freight suspended from parachutes through side doors can be facilitated by a reduction in the downwash. The potential danger of destabilising the flight path as a result of dropping a load with a parachute is reduced.

Below, an exemplary embodiment of the invention is described with reference to the attached figures.

DETAILED DESCRIPTION

Figure 1:
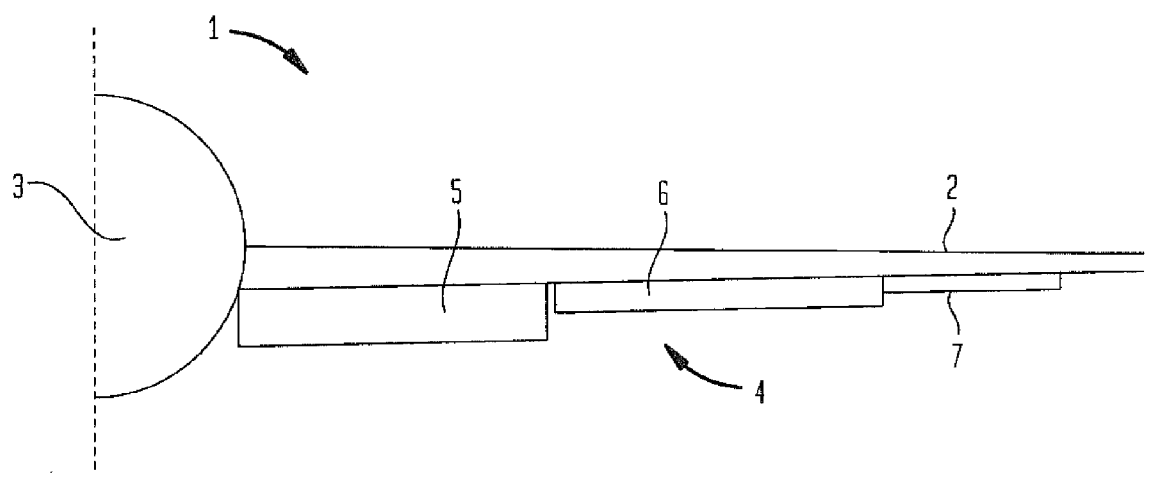
FIG. 1 shows a diagrammatic view of a system according to the invention, with flap elements in a first position according to an exemplary embodiment embodiment.

Below, identical or corresponding components have the same reference characters in the figures.

FIG. 1 shows a system 1 for setting a span load distribution of a wing 2. FIG. 1 shows the right-hand wing 2 of an aircraft (not shown), which wing extends outwards from the fuselage 3.

The wing 2 comprises a conventional base flap system 4. The conventional base flap system 4 comprises an inboard landing flap 5, an outboard landing flap 6 and an aileron 7.

According to an exemplary embodiment, the inboard landing flap 5 and the outboard landing flap 6 can be positioned independently of each other. To this effect a drive system (not shown) can be used which is able to position the inboard landing flap 5 and the outboard landing flap 6 independently of each other.

According to an exemplary embodiment of the invention, for example the inboard landing flap 5 of the wing 2 is mechanically coupled with an inboard landing flap of the other wing (not shown). Likewise, for example the outboard landing flap 6 is mechanically coupled with an outboard landing flap of the other wing (in each case not shown). The inboard landing flap 5 and the outboard landing flap 6 shown in FIG. 1 are not mechanically coupled with each other. Along their entire extension paths the inboard landing flap 5 and the outboard landing flap 6 can be positioned independently of each other, for example manually by the pilot or automatically by an electronic control system.

In FIG. 1 the inboard landing flap 5 is positioned at a larger angle than the outboard landing flap 6. In this way the load distribution of the wing 2 is displaced towards the inside so that in the region of the outboard landing flap 6 the local load on the wing 2 is reduced. By targeted reduction of the excursion of the outboard landing flap 6, in this region the airflow separation can be shifted to higher angles of attack. FIG. 1 shows an excursion of the landing flaps for optimising maximum lift, so that the region which is critical to airflow separation is relieved.

Figure 2:
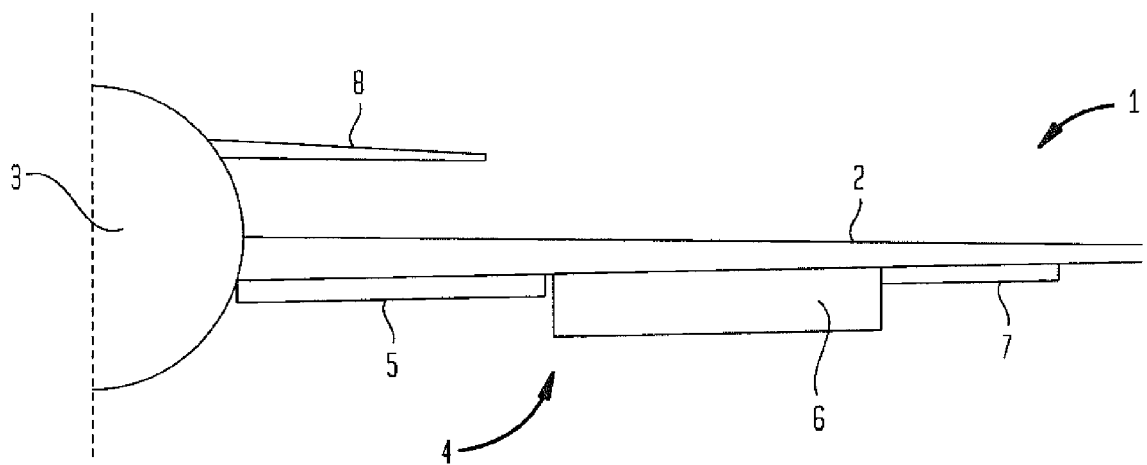
FIG. 2 shows a diagrammatic view of a system according to the invention, with flap elements in a second position according to an exemplary embodiment.

FIG. 2 is a diagrammatic view of a system with landing flap elements in a second position according to an exemplary embodiment embodiment.

In FIG. 2 the inboard landing flap 5 and the outboard landing flap 6 are in a position in which the start lift/drag ratio is optimised.

As shown in FIG. 2, in this case the outboard landing flap 6 is positioned at a larger angle than the inboard landing flap 5. In this way the load distribution of the wing 2 is displaced towards the outside so that the distribution of lift can be approximated more closely to an "ideal elliptic" distribution.

Furthermore, by the reduced excursion of the inboard landing flap 5 the downwash in the inner region (a region near the fuselage 3) is reduced, which has a positive influence on the effectiveness of a horizontal tail 8.

Although, above, the invention was described with reference to an exemplary embodiment, it is understood that changes or modifications can be made without leaving the scope of the invention, provided the individual landing flap elements of a wing 2 can be positioned independently of each other at different angles.

For example, it is possible to use more than just one inboard landing flap and one outboard landing flap as shown in the exemplary embodiment of the invention. In this case a respective drive system is required which is able to position independently of each other the individual flap elements of an airfoil that are not mechanically coupled with each other.

LIST OF REFERENCE NUMBERS

1 System
2 Wing
3 Fuselage
4 Base flap system
5 Inboard landing flap
6 Outboard landing flap
7 Aileron
8 Horizontal tail

The invention claimed is:

1. A system for setting a wing span load distribution of an aircraft wing, comprising:

a base flap system with an inner flap element and an outer flap element;
an aileron, the aileron positioned adjacent to the outer wing flap;
wherein the inner flap element and the outer flap element are arranged in a direction of the wing span at a trailing edge of the wing;
wherein the inner flap element and the outer flap element are displaceable relative to the wing span direction of the wing;
wherein the inner flap element and the outer flap element are not mechanically coupled with each other; and
wherein the outer flap element is arranged via a control system at a larger downward angle, the angle being downward with respect to the wing, than the inner flap element, which is also at a downward angle with respect to the wing, for optimising a takeoff or landing lift/drag ratio.

2. The system of claim 1, wherein, for optimising a maximum lift, an excursion of the inner and outer flap elements is reduced in a region in which airflow separation over the wing starts.

3. The system of claim 1, wherein, for reducing downwash in an inboard region of the wing, the excursion of the inner flap element is reduced.

4. An aircraft high lift system employed during takeoff or landing operations, said system comprising:

an inner flap associated with a wing of an aircraft, the wing having a tip;
an outer flap associated with the wing of the aircraft, the outer flap positioned nearer the tip of the wing than the inner flap;
an aileron associated with the wing and positioned between the outer flap and the tip of the wing; and
a control system;
wherein, during takeoff or landing operations, the control system arranges the outer flap at a downward angle with respect to the wing at an angle greater than that of the inner flap, which is also arranged at a downward angle with respect to the wing.

5. The aircraft high lift system of claim 4, wherein the inner flap and the outer flap are not mechanically coupled.

6. A high lift system employed during takeoff or landing operations for an aircraft having a right wing and a left wing, each wing having a tip, said system comprising:

a right inner flap associated with the right wing of the aircraft;
a right outer flap associated with the right wing of the aircraft, the right outer flap positioned nearer the tip of the right wing than the right inner flap;
a left inner flap associated with the left wing of the aircraft;
a left outer flap associated with the left wing of the aircraft, the left outer flap positioned nearer the tip of the left wing than the left inner flap; and
a control system;
wherein, during takeoff or landing operations, the control system angles the right outer flap downward with respect to the right wing at an angle greater than that of the right inner flap, which is angled downward with respect to the right wing, and the control system angles the left outer flap downward with respect to the left wing at an angle greater than that of the left inner flap, which is angled downward with respect to the left wing.

7. The high lift system of claim 6, wherein the right inner flap is coupled with the left inner flap.

8. The high lift system of claim 6, wherein the right outer flap is coupled with the left outer flap.

9. The high lift system of claim 6, wherein the right inner flap is coupled with the left inner flap and the right outer flap is coupled with the left outer flap.

10. The high lift system of claim 6, wherein, during takeoff or landing operations, the right outer flap is angled downward with respect to the right wing at the same angle as the left outer flap is angled with respect to the left wing.

\* \* \* \* \*